US012728942B2

(12) United States Patent
Lepage et al.

(10) Patent No.: US 12,728,942 B2
(45) Date of Patent: Sep. 8, 2026

(54) DEVICE FOR REMOVABLE ATTACHMENT OF AN ACCESSORY TO A VEHICLE

(71) Applicants: LIF (LAB), Marseilles (FR); Charlotte Lepage, Marseilles (FR); Jean-Baptiste Barbaroux, Marseilles (FR)

(72) Inventors: Charlotte Lepage, Marseilles (FR); Jean-Baptiste Barbaroux, Marseilles (FR); Mathieu Lanz, Marseilles (FR); Emilien Pothet, Marseilles (FR)

(73) Assignees: LIF (LAB), Marseilles (FR); Charlotte Lepage, Marseilles (FR); Jean-Baptiste Barbaroux, Marseilles (FR)

( * ) Notice: Subject to any disclaimer, the term of this patent is extended or adjusted under 35 U.S.C. 154(b) by 10 days.

(21) Appl. No.: 18/729,384

(22) PCT Filed: Jan. 6, 2023

(86) PCT No.: PCT/FR2023/050017
§ 371 (c)(1),
(2) Date: Jul. 16, 2024

(87) PCT Pub. No.: WO2023/135382
PCT Pub. Date: Jul. 20, 2023

(65) Prior Publication Data

US 2025/0100641 A1 Mar. 27, 2025

(30) Foreign Application Priority Data

Jan. 17, 2022 (FR) .................................. FR2200378

(51) Int. Cl.
*B62J 9/27* (2020.01)
*B62J 7/04* (2006.01)

(52) U.S. Cl.
CPC ... *B62J 9/27* (2020.02); *B62J 7/04* (2013.01)

(58) Field of Classification Search
CPC ....... B62J 9/24; B62J 9/27; B62J 7/04; F16M 13/02

(Continued)

(56) References Cited

U.S. PATENT DOCUMENTS 5,484,667 A * 1/1996 Sahli .................. H01M 50/291 180/68.5
6,230,834 B1 * 5/2001 Van Hout ............... B60R 16/04 180/68.5

(Continued)

FOREIGN PATENT DOCUMENTS

DE 19609692 A1 * 9/1997 ................ B62J 9/24
DE 102006018237 A1 10/2007

(Continued)

OTHER PUBLICATIONS

International Search Report issued in PCT/FR2023/050017 dated Apr. 18, 2023 (5 pages).

*Primary Examiner* — Justin M Larson
(74) *Attorney, Agent, or Firm* — ROTHWELL, FIGG, ERNST & MANBECK, P.C.

(57) ABSTRACT

Embodiments of this disclosure relate to a device for removable attachment of an accessory to a vehicle, comprising one plate intended to be rigidly connected to the vehicle and another plate to which the accessory is intended to be rigidly connected, one of the plates, referred to as the female plate, comprising two lateral centering guides, each provided with an inclined plane so as to define, with the interlocking face of the plate, a female interlocking profile, and the other plate, referred to as the male plate, comprising two inclined planes forming, with an interlocking face of the plate, a male interlocking profile capable of cooperating with the female interlocking profile of the female plate. The device also comprises a mechanical and automatic centering and locking system having at least two centering and locking members, (Continued)

at least one of which is movable between a locked position in which the plates are locked together while eliminating play, and an unlocked position in which the plates are unlocked from one another, and an inclined plane capable of cooperating with one of the members so as to ensure that the plates are centred and locked together.

9 Claims, 4 Drawing Sheets

(58) Field of Classification Search
USPC ....... 224/42.4; 248/503, 223.31, 681, 224.61
See application file for complete search history.

(56) References Cited

U.S. PATENT DOCUMENTS

| | | | | |
|---|---|---|---|---|
| 8,919,624 | B2 * | 12/2014 | Visenzi | B62J 9/27<br>403/325 |
| 11,286,015 | B2 * | 3/2022 | Marchildon | B60R 9/00 |
| 11,524,739 | B2 * | 12/2022 | Alagourie | B62J 11/00 |
| 11,890,996 | B2 * | 2/2024 | Jackson | B60R 11/06 |
| 2006/0138185 | A1 * | 6/2006 | Lien | B62J 7/04<br>224/427 |
| 2020/0055559 | A1 * | 2/2020 | Alagourie | B62J 9/24 |
| 2025/0100641 | A1 * | 3/2025 | Lepage | B62J 9/24 |

FOREIGN PATENT DOCUMENTS

| | | | |
|---|---|---|---|
| FR | 3010692 | A1 | 3/2015 |
| JP | 2010064729 | A | 3/2010 |
| WO | 2009030139 | A1 | 3/2019 |

* cited by examiner

[Fig. 1A-1B]
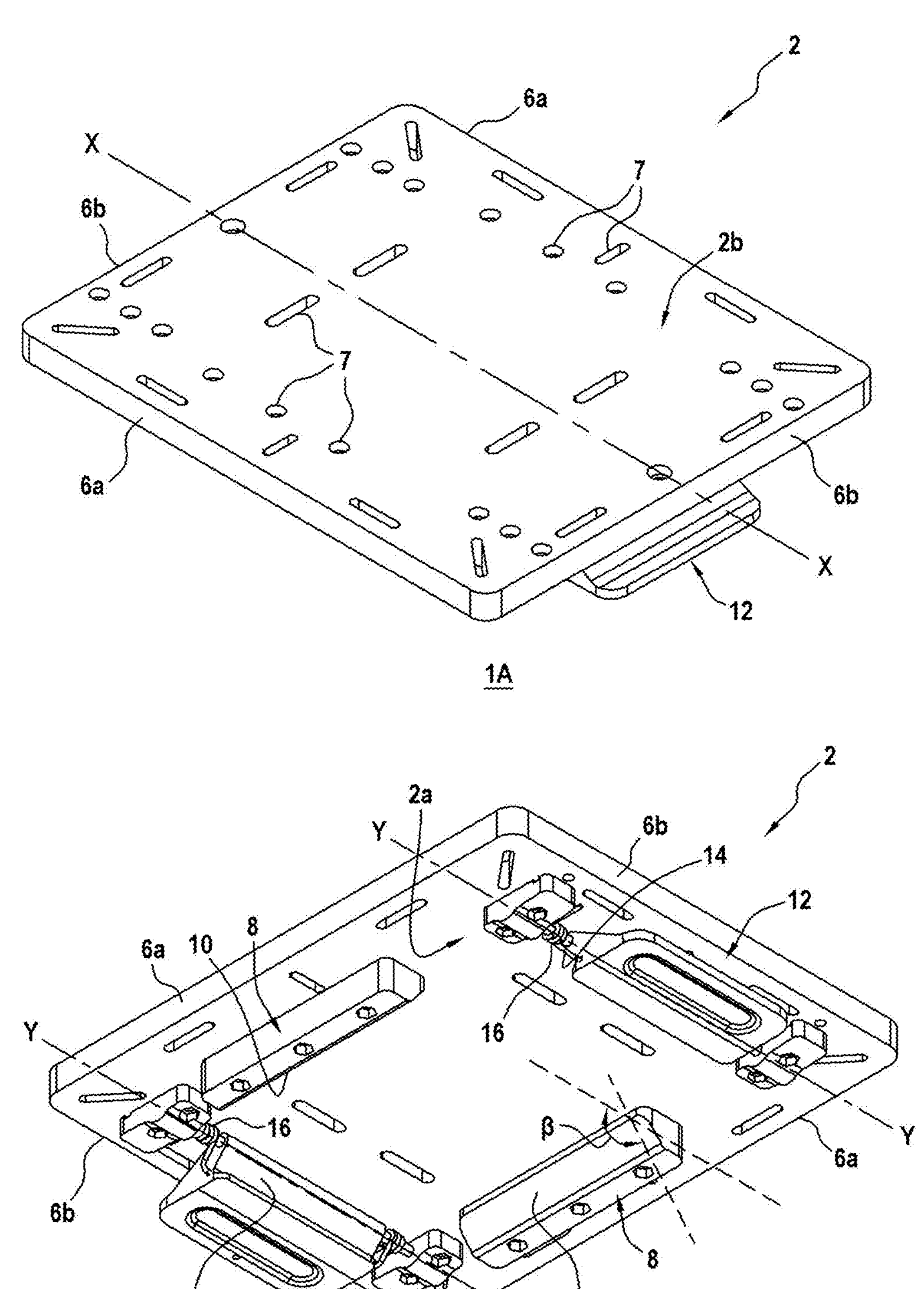

[Fig. 2A-2B]
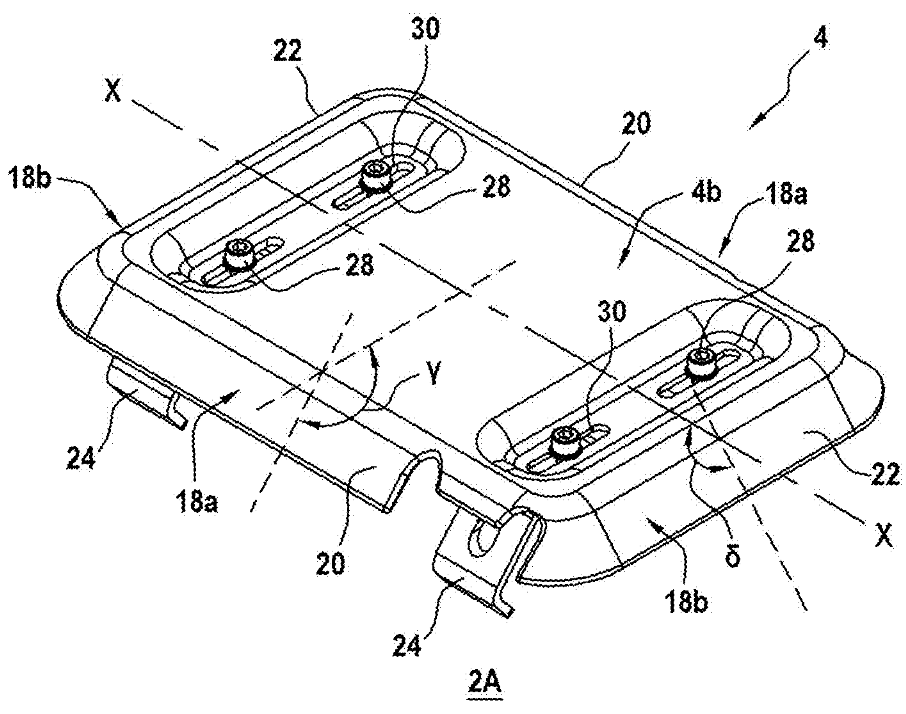
2A
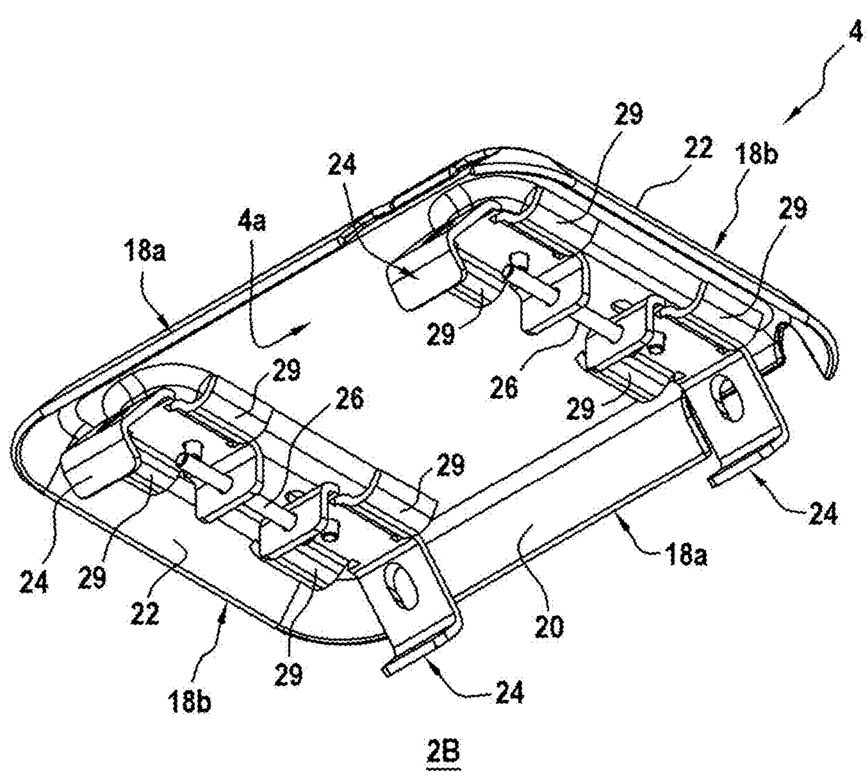
2B

[Fig. 3]
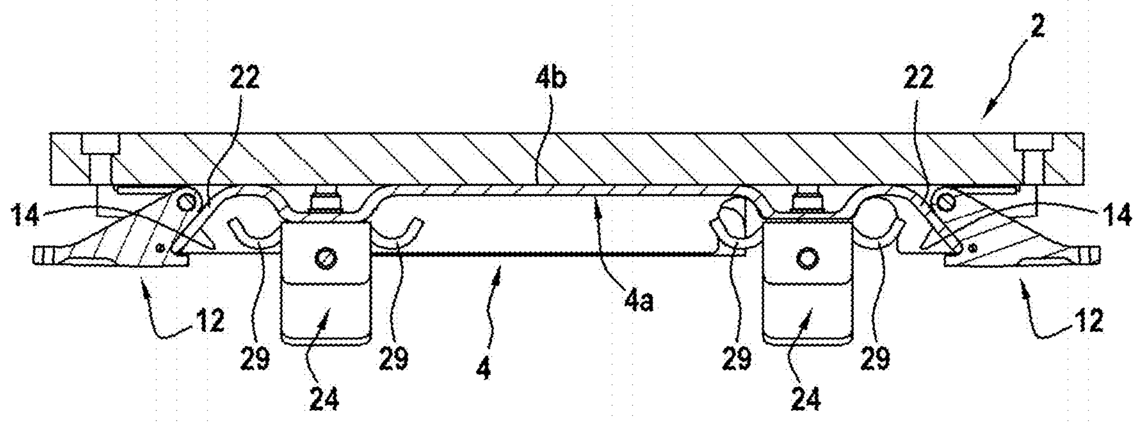
[Fig. 4]
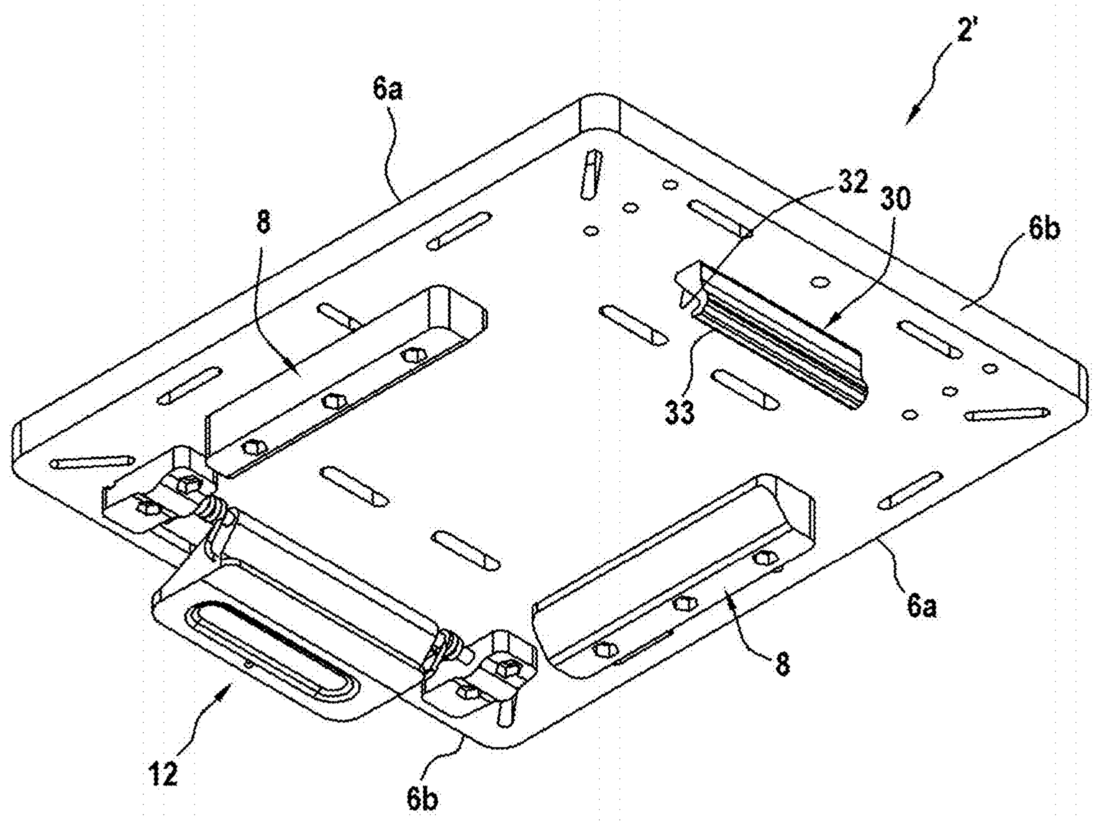

[Fig. 5A-5B]
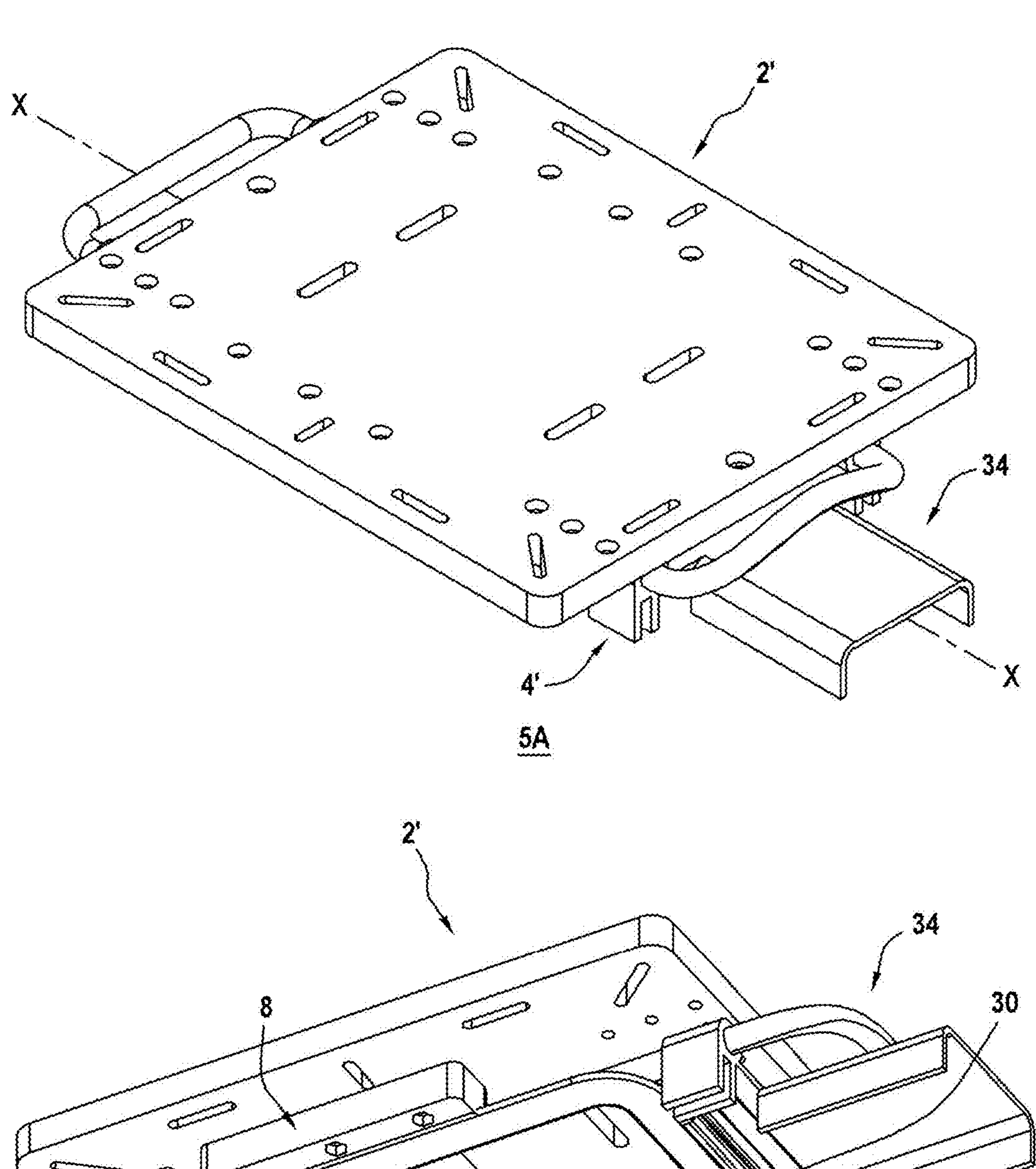

DEVICE FOR REMOVABLE ATTACHMENT OF AN ACCESSORY TO A VEHICLE

CROSS REFERENCE TO RELATED APPLICATIONS

This application is a 35 U.S.C. § 371 National Stage of International Patent Application No. PCT/FR2023/050017, filed 2023 Jan. 6, which claims priority to French Patent Application No. 2200378, filed 2022 Jan. 17. The above identified applications are incorporated by this reference.

TECHNICAL FIELD

The present invention relates to the general field of light vehicles, in particular that of bicycles. More precisely, it relates to a device enabling an accessory to be removably attached to the luggage rack of such a vehicle or directly to it.

PRIOR ART

Transport of accessories (such as luggage, a basket, a child seat, etc.) on a bicycle is typically carried out by means of its luggage rack (the luggage rack being able to be at the front or rear of the bicycle).

One of the known solutions for positioning and removably attaching the accessory to be transported to the luggage rack of a bicycle consists of using straps, cords, or even tensioners (of the Sandow type).

However, this attachment device has many disadvantages. In particular, it can be made complex due to the size, shape and/or weight of the accessory to be transported. Furthermore, this device is insecure, long and tedious to use, both during loading of the accessory on the luggage rack as well as during its unloading. In particular, the time taken for mounting the accessory makes such a method particularly inefficient in the context of daily loading/unloading, or even in a context of regular changing of different accessories in order to best adapt the configuration of the bicycle to the various needs encountered during the day.

Other different attachment devices have been developed in order to simplify and reduce the time necessary for loading/unloading the accessory to be transported. Certain of these devices use an attachment base which is mounted and attached on the luggage rack of the bicycle and on which the accessory to be transported (for example a basket or a child seat) is removably assembled.

Reference can be made to the documents FR 3,010,692, DE 20 2020 0000 129 U1 and WO 2021/063432 which disclose systems for attaching bags on a luggage rack provided, in particular, with removable claw-type attachment elements for gripping luggage rack tubes. Reference can also be made to document JP 4041666, which describes a base system, wherein the attachment of the accessory on the luggage rack of the bicycle is performed by interlocking of shapes. Reference can also be made to document CN 103552629 which has a base system for the attaching a container, wherein the attachment is obtained by means of an assembly slot and an incorporated arm which pivots in the assembly slot.

Although they facilitate and accelerate the loading/unloading of the accessory to be transported, these base attachment devices nevertheless have several disadvantages. One of the main disadvantages of these devices resides in the absence of self-centering of the accessory during its loading, which requires high precision on the part of the user in order to correctly attach the accessory. The mechanism is thus not very practical, in particular in the case of heavy and/or high-volume loads to be transported.

Moreover, these devices generally have the disadvantage of requiring a succession of movements along different axes (vertical and horizontal) during loading, in order to correctly pre-position the accessory before its attachment to the base. However, such a combination of movements makes the loading considerably more complex and the horizontal component of these movements, in the direction from rear to front, destabilises the bicycle, which makes loading of heavy and bulky accessories particularly difficult or even dangerous.

Others of these devices have a loading of the accessory which requires a movement in the horizontal direction only, which also destabilises the bicycle, even when it is resting on its stand. Indeed, one hand must hold the bicycle in position, and the other must hold the accessory to be loaded, in order to enable the two to come together and to lock the system.

In addition, the majority of these attachment devices do not enable play to be taken up during attachment of the accessory, which can make the transport uncomfortable, or even dangerous, for heavy loads and can generate accelerated wear of the mechanisms.

DISCLOSURE OF THE INVENTION

The object of the invention is therefore an attachment device which does not have the above-mentioned disadvantages.

According to the invention, this goal is achieved by a device for the removable attachment of an accessory to a vehicle, comprising one plate intended to be rigidly connected to the vehicle and another plate to which the accessory is intended to be rigidly connected, the plates being able to be removably attached to one another,

- one of the plates, referred to as the female plate, comprising
  - at least two lateral centering guides positioned projecting on an interlocking face of the plate along two first opposite sides thereof, the lateral guides each being provided with an inclined plane so as to define, with the interlocking face of the plate, a female interlocking profile, and
- the other plate, referred to as the male plate, comprising:
  - at least two inclined planes formed along first opposite sides of the plate, so as to form, with an interlocking face of the plate, a male interlocking profile capable of cooperating with the female interlocking profile of the female plate, each inclined plane being capable of cooperating with an inclined plane of the lateral centering guides of the female plate;
- the device further comprising a mechanical and automatic centering and locking system comprising:
  - at least two centering and locking members comprising a flat surface positioned along second sides of one and/or the other plate and at least one of which is movable between a locked position, in which the plates are locked together while eliminating play, and an unlocked position, in which the plates are unlocked from one another, the movable centering and locking member being forced into the locked position in the absence of external intervention; and
  - at least two inclined planes formed along second sides of one and/or the other plate and each capable of cooperating by contact with the flat surface of the associated centering and locking member, so as to simultaneously ensure centering and locking together of the plates, the flat surface of the movable centering and locking member being decoupled from the inclined planes when the movable centering and locking member is in the unlocked position.

The device according to the invention is characterised, in particular, in that it provides that the male and female plates cooperate with each other by an interlocking of complementary shapes. In particular, only one of the two plates is provided with mechanised elements, whereas the other plate has none. The centering of the plates with respect to one another (along the roll, pitch and yaw axes) is ensured by the lateral centering guides and by the mechanical and automatic centering and locking system. This interlocking of the plates with one another induces self-centering during the loading of the accessory on the luggage rack, which ensures blind loading of the accessory. Thus, the elements constituting the centering and locking system fulfil the two functions (centering and locking) simultaneously. Moreover, the loading and unloading of the accessory is achieved in a single vertical movement and can be carried out one-handed without destabilising the bicycle. The loading of the accessory is greatly facilitated. It is also secure due to the presence of the automatic and mechanical locking system, which ensures purely mechanical locking together of the plates, with take-up and/or elimination of the play. In this way, the device according to the invention can provide a single solution for all of the above-mentioned disadvantages of the prior art.

Moreover, the centering and locking members participate actively and directly in the locking together of the plates, but also in the centering. Furthermore, these centering and locking members can be directly operable without the need for a specific command.

The inclined planes of the lateral guides of the female plate can each form an obtuse angle with the interlocking face of the female plate and the inclined planes of the male plate can each form an obtuse angle with the interlocking face of the male plate.

Similarly, each inclined plane of the automatic and mechanical centering and locking system can form an obtuse angle with the interlocking face of the plate on which it is formed.

In an embodiment, each plate has a substantially rectangular shape with two large sides intended to be positioned along a main axis of the vehicle, the lateral guides of the female plate being positioned parallel to the large sides or to the small sides of said female plate, and the centering and locking members being positioned parallel to the other sides of one and/or the other plate.

The automatic centering and locking system can comprise two movable centering and locking members positioned along the seconds opposite sides of one and/or the other plate, each centering and locking member being mounted on a spring adjusted so as to keep it in the locked position when the spring is at rest.

In this case, the two movable centering and locking members are advantageously mechanically connected to one another so that the manual operation of one of the centering and locking members causes the operation of the other locking member.

The male plate can be intended to be mounted on a luggage rack of the vehicle and the female plate be intended to receive the accessory. Alternatively, one of the plates can be an integral part of the luggage rack of the vehicle and/or the other plate can be an integral part of the accessory.

Preferably, the plate intended to be rigidly connected to the luggage rack of the vehicle further comprises means for attachment to the vehicle, these attachment means comprising at least one group of tabs intended to cooperate with tubes of the vehicle and mounted under one face of the plate opposite to its interlocking face, the group of tabs comprising two tabs positioned on first opposite sides of the plate and connected to one another by a screw for adjusting the spacing between the tabs, each tab being operable by means of a screw accessible from the interlocking face of the plate.

In this case, the tabs of the attachment means of the plate can further comprise means for enabling the attachment of other accessories to the plate.

Preferably, the automatic and mechanical centering and locking system also further comprises a latch which is capable of blocking and forcing the centering and locking member into the locked position.

BRIEF DESCRIPTION OF THE DRAWINGS

FIG. 1A and FIG. 1B are perspective views of the upper face and the interlocking face respectively, of a female plate according to an embodiment of the device according to the invention.

FIG. 2A and FIG. 2B are perspective views of the upper face and the interlocking face respectively, of a male plate capable of cooperating with the female plate of FIGS. 1A and 1B.

FIG. 3 is a longitudinal sectional view of the plates of FIGS. 1A, 1B, 2A and 2B attached to one another.

FIG. 4 is a perspective view of the interlocking face of a female plate according to another embodiment of the device according to the invention.

FIG. 5A and FIG. 5B are perspective views of the upper face and lower face respectively, of a device according to the invention wherein the male plate is an integral part of the luggage rack of the bicycle.

DESCRIPTION OF THE EMBODIMENTS

The invention relates to a device for removable attachment of an accessory to a bicycle, and more generally to a vehicle. Here, the term "vehicle" shall mean any light vehicle, terrestrial or otherwise, motorised or not, with the exception of automobiles. Here the term "accessory" shall mean the products to be transported which enable users of the vehicle to facilitate daily life, for example luggage, a basket, a child seat, etc. The accessory can, in particular, be the frame of a child's pushchair, which can be converted into a child's bicycle seat. The device can be attached on a luggage rack of the vehicle or directly to it, by means, in particular, of an appendage attaching to an element of the vehicle (saddle post, tube, etc.).

The device according to the invention can ensure secure loading and unloading of the accessory to be transported by means of a removable attachment thereof to the vehicle.

The device according to the invention comprises, in particular, a female plate 2 (such as shown in FIGS. 1A and 1B) and a male plate 4 (such as that shown in FIGS. 2A and 2B) which are able to be removably attached one on top of the other.

One of these two plates is intended to be rigidly connected to the vehicle and the other plate is intended to be rigidly connected to the accessory to be transported.

In the exemplary embodiment of FIGS. 1A-1B, 2A-2B, 3 and 4, the female plate 2 is intended to receive the accessory to be transported, and the male plate 4 is intended to be mounted on a luggage rack of the vehicle. Of course, the reverse configuration is clearly possible.

Similarly, it is possible that the plate which is intended to be rigidly connected to the luggage rack of the vehicle (namely the male plate or the female plate) is an integral part of the luggage rack (this alternative embodiment is shown in FIGS. 5A and 5B described below).

Moreover, in the absence of a luggage rack, it is possible that the plate intended to be rigidly connected to the vehicle is connected directly to it, for example to the saddle post in the case of a bicycle.

In conjunction with FIGS. 1A and 1B, an exemplary embodiment of a female plate 2 of the attachment device according to the invention will now be described.

In this exemplary embodiment, the female plate 2 is in the form of a rectangular part, that is flattened and of relatively low thickness. It has a lower face 2*a*—also called the interlocking face (visible in FIG. 1B)—and an upper face 2*b* (visible in FIG. 1A) opposite the lower face.

With rectangular shape, the female plate 2 has two opposite large sides 6*a* which are, for example, intended to be positioned along a main axis X-X of the vehicle, and two opposite small sides 6*b*.

On its upper face 2*b*, the female plate 2 has a certain number of drilled holes 7 intended, in particular, to allow an attachment of the accessory to be transported, for example by means of screws, straps or any other means.

At its interlocking face 2*a*, the female plate 2 comprises at least two lateral guides 8 which are positioned projecting along its opposite large sides 6*a*. These lateral guides 8 are each provided with an inclined plane 10 so as to define, with the interlocking face of the female plate, a female interlocking profile.

It should be noted that the number of lateral guides could be different from two. Similarly, these lateral guides could alternatively be positioned along the small sides 6*b* of the female plate.

Furthermore, the inclined planes 10 of the lateral guides 8 of the female plate each form, with the interlocking face 2*a* of the female plate, an angle $\beta$ which is obtuse (that is to say greater than 90°).

The female plate 2 also comprises, at its interlocking face 2*a*, two centering and locking members 12 which are positioned projecting along its opposite small sides 6*b* and which each comprise a flat surface 14.

Each centering and locking member 12 is movable between a locked position, in which the plates 2, 4 are locked together while eliminating play (see FIG. 3), and a unlocked position, in which the plates are unlocked from one another (see FIG. 1B).

Furthermore, each centering and locking member is forced into the locked position in the absence of external intervention.

In the exemplary embodiment of FIGS. 1A and 1B, each centering and locking member 12 is in the form of a handle articulated around an axis Y-Y parallel to the small sides 6*b* of the female plate and mounted on two springs 16 which are adjusted so as to keep the centering and locking member in the locked position when the springs are at rest.

Of course, the centering and locking members could take a different shape. For example, it is possible that they could be in the form of parts that are plastically deformable between their locked position and their unlocked position. It is also possible that they are controlled remotely by a remote control.

Similarly, as shown in FIG. 4, a single movable centering and locking member could be provided on one and/or the other plate.

Preferably, the two movable centering and locking members 12 are mechanically connected to one another (for example by a cable or a rod that is not shown in the figures) so that the manual operation of one of the centering and locking members automatically causes the operation of the other centering and locking member. This can facilitate one-handed unlocking of the plates from one another when it is necessary to unload the accessory.

Preferably also, a latch can be provided, which is capable of blocking and forcing the centering and locking members into the locked position, in order to avoid any accidental unlocking.

In conjunction with FIGS. 2A and 2B, an exemplary embodiment of a male plate 4 capable of cooperating with the female plate of FIGS. 1A and 1B will now be described.

In this exemplary embodiment, the male plate 4 is also in the form of a rectangular part, that is flattened and of relatively low thickness. It has a lower face 4*a* (visible in FIG. 2B) and an upper face 4*b* (visible in FIG. 2A) opposite the lower face and called the interlocking face.

As for the female plate, the male plate 4 has two opposite large sides 18*a* which are, for example, intended to be positioned along a main axis X-X of the vehicle and aligned with the large sides of the female plate, and two opposite small sides 18*b*.

At its interlocking face 4*b*, the male plate 4 comprises at least two inclined planes 20, which are formed along first opposite sides of the plate (here, along the large sides 18*a* of the plate) and which are each able to cooperate with one of the inclined planes 10 of the lateral guides 8 of the female plate 2.

These inclined planes 20 thus make it possible to form, with the interlocking face 4*b*, a male interlocking profile capable of cooperating with the female interlocking profile of the female plate.

Of course, the number of inclined planes of the male plate could be different, depending on the number of lateral guides of the female plate. Similarly, the positioning of these inclined planes could be along the small sides of the male plate (in the case where the lateral guides of the female plate are positioned along the small sides).

It will be noted that, in order to enable a perfect interlocking of the respective interlocking profiles of the male plate and the female plate, the inclined planes 20 of the male plate each form, with the interlocking face thereof, an angle $\gamma$ which is obtuse and which substantially corresponds to the angle $\beta$ which is formed by each of the inclined planes 10 of the lateral guides 8 of the female plate, with the interlocking face 2*a* thereof.

At its interlocking face 4*b*, the male plate 4 also comprises two inclined planes 22 formed along its small sides 18*b*, these inclined planes 22 each forming an obtuse angle $\delta$ with the interlocking face of the male plate.

Furthermore, these inclined planes are each capable of cooperating by contact with the flat surface 14 of the centering and locking members 12 when the latter are in the locked position. When the centering and locking members 12 are in the unlocked position, their respective flat surface 14 is totally decoupled (i.e. without any contact) from the inclined planes 22 of the male plate.

Thus, at the same time as the user interlocks the respective interlocking profiles of the male plate and the female plate, the centering and locking members 12 automatically lock (due to the presence of the springs 16) so as to ensure a centering and locking together of the plates.

It will be noted that the number and placement of the inclined planes of the male plate depends on the number and placement of the centering and locking members and of the lateral centering guides of the female plate.

In the exemplary embodiment of FIGS. 1A-1B, 2A-2B, 3 and 4, in which the male plate 4 is intended to be mounted on the luggage rack of the vehicle, the lower face 4*a* of this plate further comprises means for attachment on the luggage rack of the vehicle.

For example, as shown in FIG. 2B, these attachment means can comprise two groups of tabs mounted under the interlocking face of the male plate and intended to cooperate with tubes of the luggage rack of the vehicle (not shown in the figures) in order to ensure an attachment of the male plate thereon.

For this purpose, each group of tabs comprises two tabs 24 which are positioned along the opposite large sides 18*a* of the plate and which are connected together by a screw 26 enabling the spacing between the tabs to be adjusted.

Each tab 24 is furthermore attached to the plate 4 by means of clamping screws 28 that are accessible from the interlocking face of the male plate and can move in a groove 30.

It will be noted that the tabs of these attachment means of the plate can further comprise means for enabling the attachment of other accessories to the male plate. For example, these means can be in the form of additional claws 29 enabling the attachment of other accessories by clamping between the additional claws 29 and the lower face 4*a* of the male plate. Alternatively, this attachment of other accessories on the male plate can be carried out by clamping (or pinching) directly between the body of the tab 24 and the male plate at the clamping screw 28 and the groove 30.

The removable attachment of an accessory on the luggage rack of a vehicle by means of the device according to the invention as previously described, is obtained in the following manner.

First, the male plate 4 is mounted on the luggage rack of the vehicle by means of the groups of tabs 24 and clamping screws 26 and 28.

The user then grasps the female plate 2 (on which the accessory to be transported or forming an integral part of this accessory is attached) and blindly positions it on the male plate. The presence of the lateral guides 8 equipped with inclined planes 10 on the interlocking face of the female plate and the centering and locking members, enables an automatic centering of the female plate on the male plate to be ensured, without the user needing to have a view of the interlocking faces of the two plates.

Once the plates are correctly positioned with respect to each other, the centering and locking members 12 of the female plate move away from their locked position by contact between their flat surface 14 and the inclined planes 22 formed along the small sides 18*b* of the male plate. When the respective interlocking faces of the plates are perfectly interlocked with each other (see FIG. 3), the centering and locking members 12 automatically lock under the effect of the springs 16, thus ensuring locking together of the plates with an elimination and/or take-up of the play.

In conjunction with FIGS. 4, 5A and 5B, various alternative embodiments of the device according to the invention will now be described.

FIG. 4 shows an alternative embodiment of the female plate 2', in which this has only one movable centering and locking member 12 positioned projecting along one of its two opposite small sides 6*b*.

Along its other small side 6*b*, the female plate 2' comprises, in place of a movable centering and locking member, a fixed centering and locking member comprising a transverse guide 30 provided with an inclined plane 32 which is intended to cooperate with the inclined plane formed along the corresponding small side of the male plate and which ends in a rim 33 forming a locking hook.

FIGS. 5A and 5B show another alternative embodiment of the device according to the invention, wherein the male plate 4' forms an integral part of the luggage rack 34 of the vehicle.

More precisely, these figures show the female plate 2' (corresponding, for example, to the female plate of FIG. 4 with a single centering and locking member 12 and a transverse guide 30) which is attached on the male plate 4', the latter being directly incorporated in the luggage rack 34 of the vehicle. For this purpose, the male plate 4' in this integrated version comprises all of the technical features previously described in conjunction, in particular, with FIGS. 2A and 2B.

Furthermore, in the exemplary embodiments described above, the members for centering and locking together the plates are mounted on the female plate.

Of course, a configuration is possible in which these centering and locking members are positioned on the male plate, for example at the small sides thereof. For example, these centering and locking members can be in the form of pivoting flaps which are mounted on springs and which are operated by means of a strap (or other means) to enable their unlocking.

The invention claimed is:

1. A device for the removable attachment of an accessory to a vehicle, comprising one plate intended to be rigidly connected to the vehicle and another plate to which the accessory is intended to be rigidly connected, the plates being able to be removably attached to one another, one of the plates, referred to as the female plate comprising:

at least two lateral centering guides positioned projecting on an interlocking face of the plate along two first opposite sides thereof, the lateral guides each being provided with an inclined plane so as to define, with the interlocking face of the plate, a female interlocking profile, and the other plate, referred to as the male plate comprising:

at least two inclined planes formed along first opposite sides of the plate, so as to form, with an interlocking face of the plate, a male interlocking profile capable of cooperating with the female interlocking profile of the female plate, each inclined plane being capable of cooperating with an inclined plane of the lateral centering guides of the female plate;

the device further comprising a mechanical and automatic centering and locking system comprising:

at least two centering and locking members comprising a flat surface positioned along second sides of one and/or the other plate and at least one of which is movable between a locked position, in which the plates are locked together while eliminating play, and an unlocked position, in which the plates are unlocked from one another, the movable centering and locking member being forced into the locked position in the absence of external intervention; and at least two inclined planes formed along second sides of one and/or the other plate and each capable of cooperating by contact with the flat surface of the associated centering and locking member, so as to simultaneously ensure centering and locking together of the plates, the flat surface of the movable centering and locking member being decoupled from the inclined planes when the movable centering and locking member is in the unlocked position.

2. The device according to claim 1, wherein the inclined planes of the lateral guides of the female plate each form an obtuse angle (B) with the interlocking face of the female plate, and the inclined planes of the male plate each form an obtuse angle ($\gamma$) with the interlocking face of the male plate.

3. The device according to claim 1, wherein each inclined plane of the mechanical and automatic centering and locking system forms an obtuse angle (8) with the interlocking face of the plate on which it is formed.

4. The device according to claim 1, wherein each plate has a substantially rectangular shape with two large sides intended to be positioned along a main axis (X-X) of the vehicle, the lateral guides of the female plate being positioned parallel to the large sides or to the small sides of said female plate, and the centering and locking members being positioned parallel to the other sides of one and/or the other plate.

5. The device according to claim 1, wherein the automatic centering and locking system comprises two movable centering and locking members positioned along the seconds opposite sides of one and/or the other plate, each centering and locking member being mounted on a spring adjusted so as to keep it in the locked position when the spring is at rest.

6. The device according to claim 1, wherein the male plate is intended to be mounted on a luggage rack of the vehicle and the female plate is intended to receive the accessory.

7. The device according to claim 1, wherein one of the plates forms an integral part of a luggage rack of the vehicle and/or the other plate forms an integral part of the accessory.

8. The device according to claim 1, wherein the plate intended to be rigidly connected to the vehicle further comprises means for attachment to the vehicle, these attachment means comprising at least one group of tabs intended to cooperate with tubes of the vehicle and mounted under one face of the plate opposite its interlocking face, the group of tabs comprising two tabs positioned on first opposite sides of the plate and connected to one another by a screw for adjusting the spacing between the tabs, each tab being operable by means of a screw accessible from the interlocking face of the plate.

9. The device according to claim 8, wherein the tabs of the attachment means of the plate further comprise means for enabling the attachment of other accessories to the plate.

* * * * *